(12) United States Patent
Salter et al.

(10) Patent No.: US 10,281,113 B1
(45) Date of Patent: May 7, 2019

(54) VEHICLE GRILLE

(71) Applicant: Ford Global Technologies, LLC, Dearborn, MI (US)

(72) Inventors: Stuart C. Salter, White Lake, MI (US); Paul Kenneth Dellock, Northville, MI (US); Richard Gall, Ann Arbor, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/911,686

(22) Filed: Mar. 5, 2018

(51) Int. Cl.
| | |
|---|---|
| *B60Q 1/00* | (2006.01) |
| *F21V 9/30* | (2018.01) |
| *F21V 9/08* | (2018.01) |
| *F21S 41/20* | (2018.01) |
| *F21W 104/00* | (2018.01) |
| *B60R 19/52* | (2006.01) |
| *F21Y 115/10* | (2016.01) |

(52) U.S. Cl.
CPC ............. *F21V 9/30* (2018.02); *F21S 41/285* (2018.01); *F21V 9/08* (2013.01); *B60R 19/52* (2013.01); *F21W 2104/00* (2018.01); *F21Y 2115/10* (2016.08)

(58) Field of Classification Search
None
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |
| 6,294,990 | B1 | 9/2001 | Knoll et al. |
| 6,419,854 | B1 | 7/2002 | Yocom et al. |
| 6,494,490 | B1 | 12/2002 | Trantoul |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Vip Patel
(74) *Attorney, Agent, or Firm* — Vichit Chea; Price Heneveld LLP

(57) ABSTRACT

A vehicle lighting assembly is provided herein. The lighting assembly includes a panel defining an integrally formed cavity and a locator. A circuit board is disposed along the panel and defines an opening. The locator is disposed within the opening. A light source is coupled to the circuit board. The light source is disposed within the cavity. A substrate is disposed along an opposing side of the circuit board from the panel.

20 Claims, 5 Drawing Sheets

(56) References Cited

U.S. PATENT DOCUMENTS

| | | |
|---|---|---|
| 7,015,893 B2 | 3/2006 | Li et al. |
| 7,161,472 B2 | 1/2007 | Strumolo et al. |
| 7,213,923 B2 | 5/2007 | Liu et al. |
| 7,216,997 B2 | 5/2007 | Anderson, Jr. |
| 7,249,869 B2 | 7/2007 | Takahashi et al. |
| 7,264,366 B2 | 9/2007 | Hulse |
| 7,264,367 B2 | 9/2007 | Hulse |
| 7,347,576 B2 | 3/2008 | Wang et al. |
| 7,441,914 B2 | 10/2008 | Palmer et al. |
| 7,501,749 B2 | 3/2009 | Takeda et al. |
| 7,575,349 B2 | 8/2009 | Bucher et al. |
| 7,635,212 B2 | 12/2009 | Seidler |
| 7,726,856 B2 | 6/2010 | Tsutsumi |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |
| 8,016,465 B2 | 9/2011 | Egerer et al. |
| 8,022,818 B2 | 9/2011 | la Tendresse et al. |
| 8,044,415 B2 | 10/2011 | Messere et al. |
| 8,066,416 B2 | 11/2011 | Bucher |
| 8,071,988 B2 | 12/2011 | Lee et al. |
| 8,097,843 B2 | 1/2012 | Agrawal et al. |
| 8,118,441 B2 | 2/2012 | Hessling |
| 8,120,236 B2 | 2/2012 | Auday et al. |
| 8,136,425 B2 | 3/2012 | Bostick |
| 8,163,201 B2 | 4/2012 | Agrawal et al. |
| 8,169,131 B2 | 5/2012 | Murazaki et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,261,686 B2 | 9/2012 | Birman et al. |
| 8,286,378 B2 | 10/2012 | Martin et al. |
| 8,317,329 B2 | 11/2012 | Seder et al. |
| 8,317,359 B2 | 11/2012 | Harbers et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,459,832 B2 | 6/2013 | Kim |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,539,702 B2 | 9/2013 | Li et al. |
| 8,552,848 B2 | 10/2013 | Rao et al. |
| 8,606,430 B2 | 12/2013 | Seder et al. |
| 8,624,716 B2 | 1/2014 | Englander |
| 8,631,598 B2 | 1/2014 | Li et al. |
| 8,653,553 B2 | 2/2014 | Yamazaki et al. |
| 8,664,624 B2 | 3/2014 | Kingsley et al. |
| 8,683,722 B1 | 4/2014 | Cowan |
| 8,724,054 B2 | 5/2014 | Jones |
| 8,754,426 B2 | 6/2014 | Marx et al. |
| 8,773,012 B2 | 7/2014 | Ryu et al. |
| 8,846,184 B2 | 9/2014 | Agrawal et al. |
| 8,851,694 B2 | 10/2014 | Harada |
| 8,876,352 B2 | 11/2014 | Robbins et al. |
| 8,905,610 B2 | 12/2014 | Coleman et al. |
| 8,952,341 B2 | 2/2015 | Kingsley et al. |
| 8,975,532 B2 | 3/2015 | Friedrich et al. |
| 8,994,495 B2 | 3/2015 | Dassanayake et al. |
| 9,006,751 B2 | 4/2015 | Kleo et al. |
| 9,018,833 B2 | 4/2015 | Lowenthan et al. |
| 9,057,021 B2 | 6/2015 | Kingsley et al. |
| 9,059,378 B2 | 6/2015 | Verger et al. |
| 9,065,447 B2 | 6/2015 | Buttolo et al. |
| 9,067,530 B2 | 6/2015 | Bayersdorfer et al. |
| 9,187,034 B2 | 11/2015 | Tarahomi et al. |
| 9,299,887 B2 | 3/2016 | Lowenthal et al. |
| 9,315,148 B2 | 4/2016 | Schwenke et al. |
| 9,452,709 B2 | 9/2016 | Aburto Crespo |
| 9,568,659 B2 | 2/2017 | Verger et al. |
| 9,616,812 B2 | 4/2017 | Sawayanagi |
| 9,714,749 B1 | 7/2017 | Salter et al. |
| 2002/0159741 A1 | 10/2002 | Graves et al. |
| 2002/0163792 A1 | 11/2002 | Formoso |
| 2003/0167668 A1 | 9/2003 | Fuks et al. |
| 2003/0179548 A1 | 9/2003 | Becker et al. |
| 2004/0213088 A1 | 10/2004 | Fuwausa |
| 2005/0084229 A1 | 4/2005 | Babbitt et al. |
| 2005/0189795 A1 | 9/2005 | Roessler |
| 2006/0087826 A1 | 4/2006 | Anderson, Jr. |
| 2006/0097121 A1 | 5/2006 | Fugate |
| 2007/0032319 A1 | 2/2007 | Tufte |
| 2007/0081339 A1 | 4/2007 | Chung et al. |
| 2007/0285938 A1 | 12/2007 | Palmer et al. |
| 2007/0297045 A1 | 12/2007 | Sakai et al. |
| 2008/0205075 A1 | 8/2008 | Hikmet et al. |
| 2009/0217970 A1 | 9/2009 | Zimmerman et al. |
| 2009/0219730 A1 | 9/2009 | Syfert et al. |
| 2009/0251920 A1 | 10/2009 | Kino et al. |
| 2009/0260562 A1 | 10/2009 | Folstad et al. |
| 2009/0262515 A1 | 10/2009 | Lee et al. |
| 2010/0102736 A1 | 4/2010 | Hessling |
| 2011/0012062 A1 | 1/2011 | Agrawal et al. |
| 2011/0265360 A1 | 11/2011 | Podd et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0050979 A1 | 2/2013 | Van De Ven et al. |
| 2013/0092965 A1 | 4/2013 | Kijima et al. |
| 2013/0335994 A1 | 12/2013 | Mulder et al. |
| 2014/0003044 A1 | 1/2014 | Harbers et al. |
| 2014/0029281 A1 | 1/2014 | Suckling et al. |
| 2014/0065442 A1 | 3/2014 | Kingsley et al. |
| 2014/0103258 A1 | 4/2014 | Agrawal et al. |
| 2014/0211498 A1 | 7/2014 | Cannon et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0085488 A1 | 3/2015 | Grote, III et al. |
| 2015/0109602 A1 | 4/2015 | Martin et al. |
| 2015/0138789 A1 | 5/2015 | Singer et al. |
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2017/0158125 A1 | 6/2017 | Schuett et al. |
| 2017/0167716 A1 | 6/2017 | Ezaki et al. |
| 2017/0253179 A1 | 9/2017 | Kumada |

FOREIGN PATENT DOCUMENTS

| | | |
|---|---|---|
| CN | 201193011 Y | 2/2009 |
| CN | 202598397 U | 12/2012 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| JP | 5478467 B2 | 2/2014 |
| KR | 20060026531 A | 3/2006 |
| WO | 2006047306 A1 | 5/2006 |
| WO | 2014068440 A1 | 5/2014 |
| WO | 2014161927 A1 | 10/2014 |

VEHICLE GRILLE

FIELD OF THE INVENTION

The present disclosure generally relates to vehicle lighting assemblies, and more particularly, to vehicle lighting assemblies that may be disposed within a vehicle grille.

BACKGROUND OF THE INVENTION

Exterior vehicle lighting applications continue to grow in popularity. Accordingly, a lighting assembly that may be integrated into a vehicle grille is provided herein that is operable to provide functional lighting as well as impart a stylistic element to a vehicle.

SUMMARY OF THE INVENTION

According to one aspect of the present disclosure, a vehicle lighting assembly is provided herein. The vehicle lighting assembly includes a panel defining an integrally formed cavity and a locator. A circuit board is disposed along the panel and defines an opening. The locator is disposed within the opening. A light source is coupled to the circuit board. The light source is disposed within the cavity. A substrate is disposed along an opposing side of the circuit board from the panel.

According to another aspect of the present disclosure, a vehicle lighting assembly is provided herein. The vehicle lighting assembly includes a panel defining an integrally formed cavity. A circuit board is disposed along the panel. A light source is coupled to the circuit board. The light source is disposed within the cavity. A substrate is disposed along an opposing side of the circuit board from the panel. The substrate is formed from a thermally conductive polymer.

According to yet another aspect of the present disclosure, a vehicle lighting assembly is provided herein. The vehicle lighting assembly includes a circuit board disposed along a panel. A light source is coupled to the circuit board. A substrate is disposed along an opposing side of the circuit board from the panel. The light source is encapsulated between the panel and the substrate.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 2:
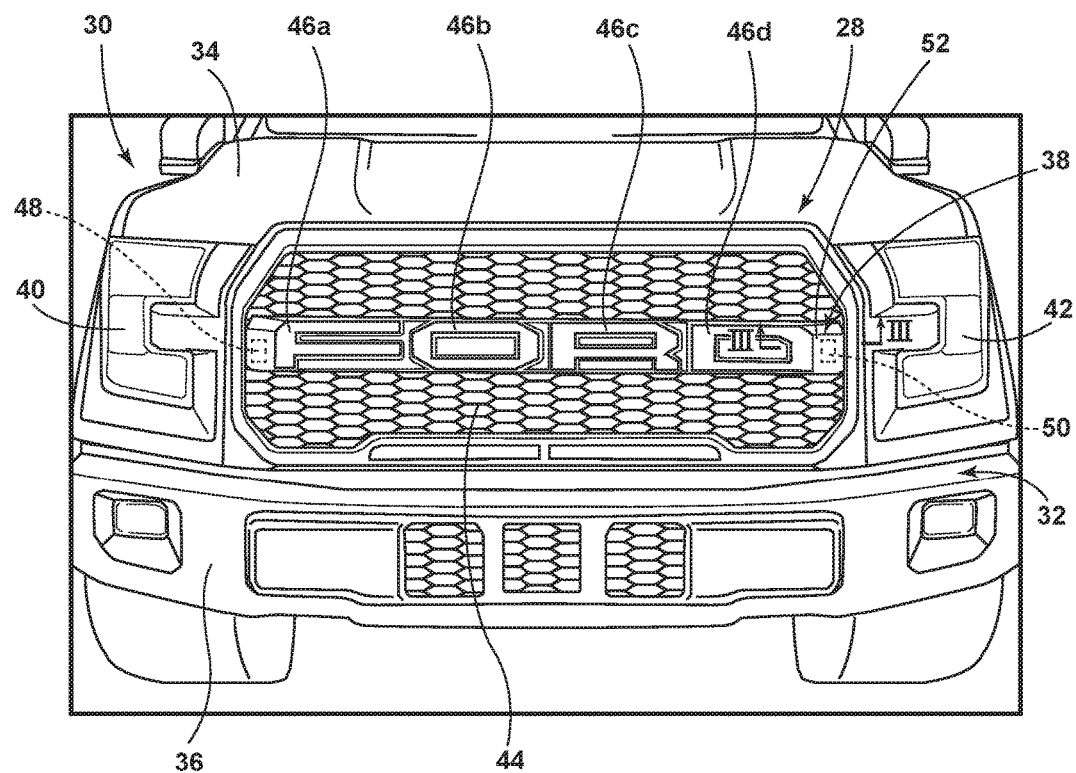
FIG. 2 is a front perspective view of a vehicle and a grille.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a grille that may be illuminated for a wide range of purposes. In some examples, the grille may be illuminated to provide messages and/or information to onlookers of the vehicle. The grille may also be illuminated to provide additional light to a user of the vehicle and/or a user of any feature of the vehicle, such as a camera disposed on the vehicle. The grille may include a substrate and a panel that are sealingly coupled to one another through a multi-step molding process. The grille may be operably coupled with phosphorescent and/or luminescent structures to luminesce in response to predefined events. The luminescent structures may be configured to convert emitted light received from an associated light source and re-emit the light at a different wavelength generally found in the visible spectrum.

Figure 1A:
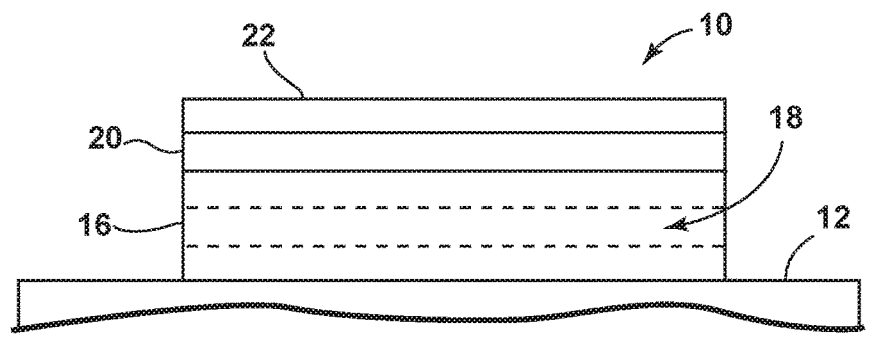
FIG. 1A is a side view of a luminescent structure rendered as a coating, according to some examples.
Figure 1B:
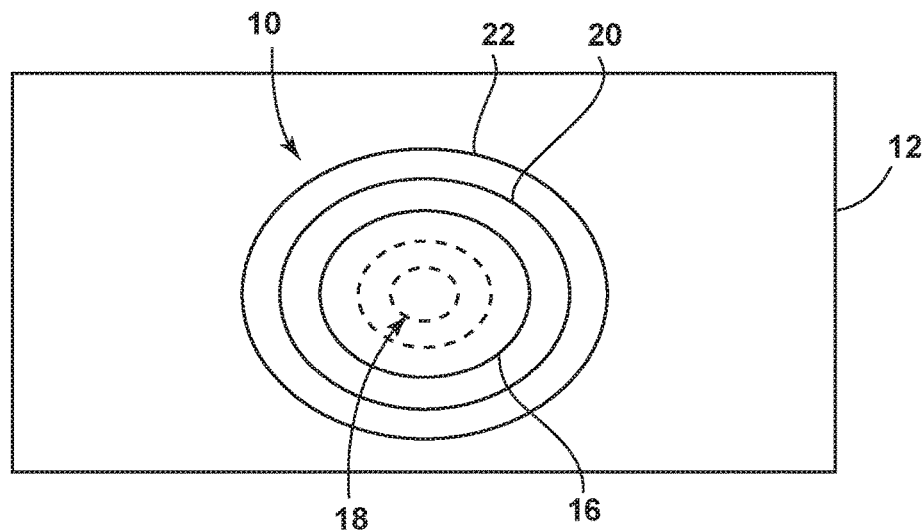
FIG. 1B is a top view of a luminescent structure rendered as a discrete particle, according to some examples.
Figure 1C:
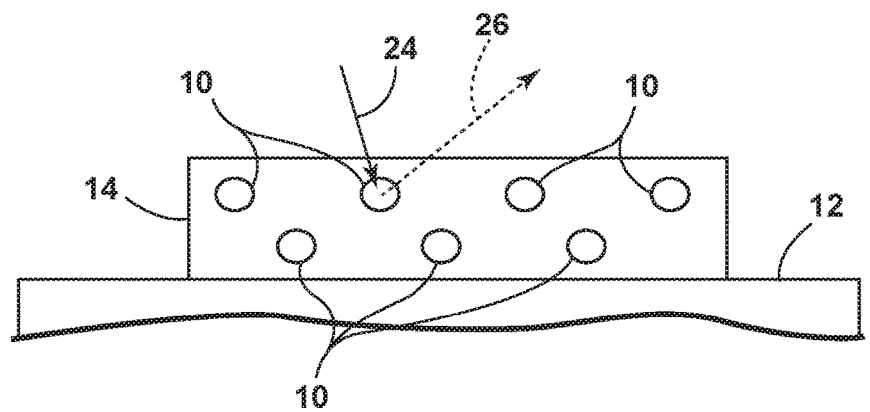
FIG. 1C is a side view of a plurality of luminescent structures rendered as discrete particles and incorporated into a separate structure.

Referring to FIGS. 1A-1C, various exemplary examples of luminescent structures 10 are shown, each capable of being coupled to a substrate 12, which may correspond to a vehicle fixture or vehicle-related piece of equipment. In FIG. 1A, the luminescent structure 10 is generally shown rendered as a coating (e.g., a film) that may be applied to a surface of the substrate 12. In FIG. 1B, the luminescent structure 10 is generally shown as a discrete particle capable of being integrated with a substrate 12. In FIG. 1C, the luminescent structure 10 is generally shown as a plurality of discrete particles that may be incorporated into a support medium 14 (e.g., a film) that may then be applied (as shown) or integrated with the substrate 12.

At the most basic level, a given luminescent structure 10 includes an energy conversion layer 16 that may include one or more sublayers, which are exemplarily shown in broken lines in FIGS. 1A and 1B. Each sublayer of the energy conversion layer 16 may include one or more luminescent materials 18 having energy converting elements with phosphorescent or fluorescent properties. Each luminescent material 18 may become excited upon receiving an emitted light 24 of a specific wavelength, thereby causing the light to undergo a conversion process. Under the principle of down conversion, the emitted light 24 is converted into a longer-wavelength, converted light 26 that is outputted from the luminescent structure 10. Conversely, under the principle of up conversion, the emitted light 24 is converted into a shorter wavelength light that is outputted from the luminescent structure 10. When multiple distinct wavelengths of light are outputted from the luminescent structure 10 at the same time, the wavelengths of light may mix together and be expressed as a multicolor light.

The energy conversion layer 16 may be prepared by dispersing the luminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the luminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In various examples, the converted light 26 that has been down converted or up converted may be used to excite other luminescent material(s) 18 found in the energy conversion layer 16. The process of using the converted light 26 outputted from one luminescent material 18 to excite another, and so on, is generally known as an energy cascade and may serve as an alternative for achieving various color expressions. With respect to either conversion principle, the difference in wavelength between the emitted light 24 and the converted light 26 is known as the Stokes shift and serves as the principal driving mechanism for an energy conversion process corresponding to a change in wavelength of light. In the various examples discussed herein, each of the luminescent structures 10 may operate under either conversion principle.

Referring back to FIGS. 1A and 1B, the luminescent structure 10 may optionally include at least one stability layer 20 to protect the luminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The luminescent structure 10 may also optionally include a protective layer 22 optically coupled and adhered to the stability layer 20 or other layer (e.g., the conversion layer 16 in the absence of the stability layer 20) to protect the luminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the luminescent material 18 may include organic or inorganic fluorescent dyes including rylenes, xanthenes, porphyrins, and phthalocyanines. Additionally, or alternatively, the luminescent material 18 may include phosphors from the group of Ce-doped garnets such as YAG:Ce and may be a short-persistence luminescent material 18. For example, an emission by $Ce^{3+}$ is based on an electronic energy transition from $4D^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the emitted light 24 and the moment when the light intensity of the converted light 26 emitted from the luminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

Figure 3:
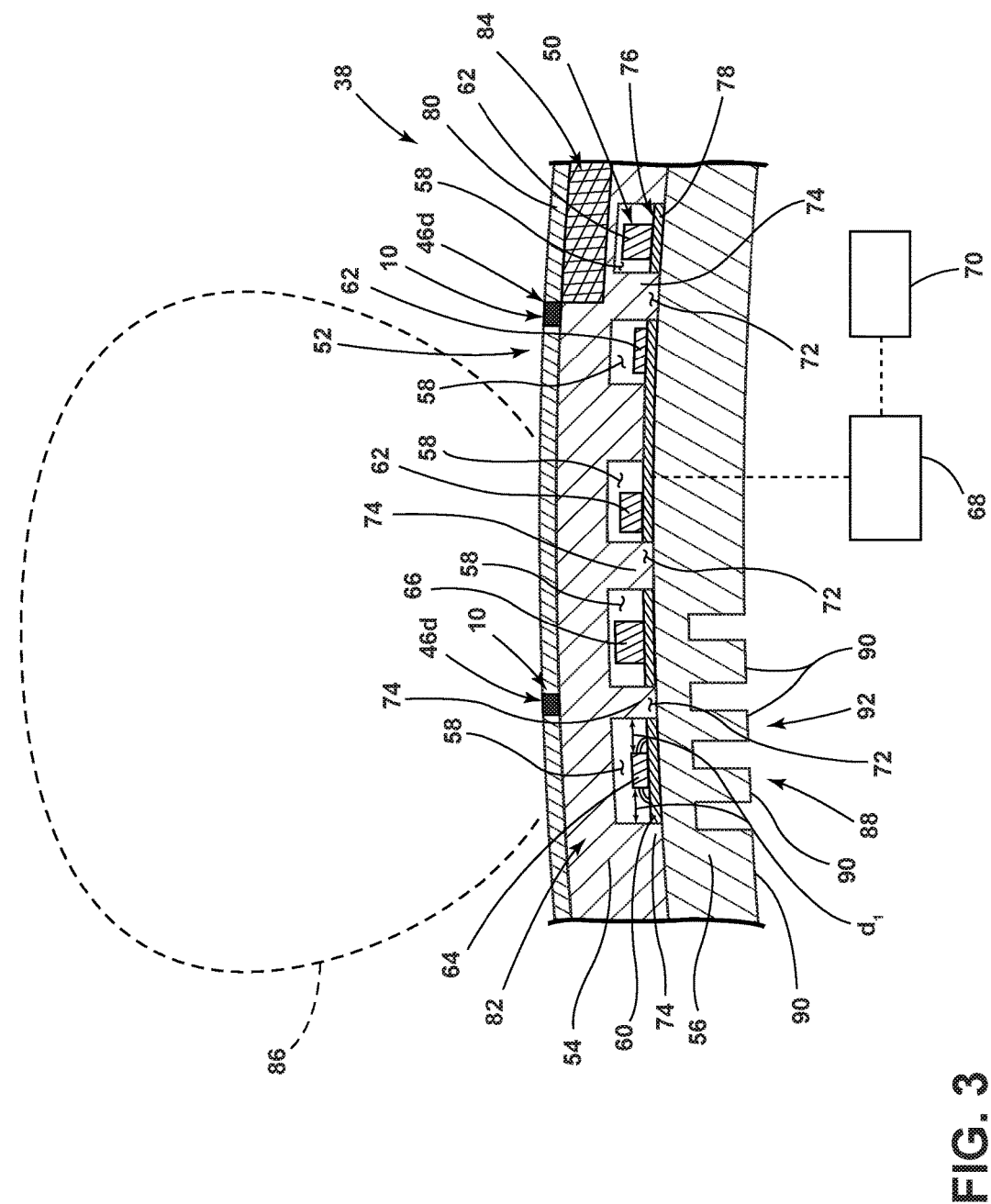
FIG. 3 is a cross-sectional view of a lighting assembly within the grille taken along line of FIG. 2.

According to various examples, a $Ce^{3+}$ garnet may be utilized, which has a peak excitation spectrum that may reside in a shorter wavelength range than that of conventional YAG:Ce-type phosphors. Accordingly, $Ce^{3+}$ has short-persistence characteristics such that its decay time may be 100 milliseconds or less. Therefore, in various examples, the rare earth aluminum garnet type Ce phosphor may serve as the luminescent material 18 with ultra-short-persistence characteristics, which can emit the converted light 26 by absorbing purple to blue emitted light 24 emanated from light sources 62 (FIG. 3). According to various examples, a ZnS:Ag phosphor may be used to create a blue-converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short-persistence luminescent material 18 known in the art may be utilized without departing from the teachings provided herein.

Additionally, or alternatively, the luminescent material 18, according to various examples, disposed within the luminescent structure 10 may include a long-persistence luminescent material 18 that emits the converted light 26, once charged by the emitted light 24. The emitted light 24 may be emitted from any excitation source (e.g., any natural light source, such as the sun, and/or any artificial light sources 62). The long-persistence luminescent material 18 may be defined as having a long decay time due to its ability to store the emitted light 24 and release the converted light 26 gradually, for a period of several minutes or hours, once the emitted light 24 is no longer present.

The long-persistence luminescent material 18, according to various examples, may be operable to emit light at or above an intensity of 0.32 mcd/m$^2$ after a period of 10 minutes. Additionally, the long-persistence luminescent material 18 may be operable to emit light above or at an intensity of 0.32 mcd/m$^2$ after a period of 30 minutes and, in various examples, for a period substantially longer than 60 minutes (e.g., the period may extend 24 hours or longer, and in some instances, the period may extend 48 hours). Accordingly, the long-persistence luminescent material 18 may continually illuminate in response to excitation from any one or more light sources 62 that emit the emitted light 24, including, but not limited to, natural light sources (e.g., the sun) and/or any artificial light sources 62. The periodic absorption of the emitted light 24 from any excitation source may provide for a substantially sustained charge of the long-persistence luminescent material 18 to provide for consistent passive illumination. In various examples, a light sensor 126 (FIG. 5) may monitor the illumination intensity of the luminescent structure 10 and actuate an excitation source when the illumination intensity falls below 0.32 mcd/m$^2$, or any other predefined intensity level.

The long-persistence luminescent material 18 may correspond to alkaline earth aluminates and silicates, for example, doped di-silicates, or any other compound that is capable of emitting light for a period of time once the emitted light 24 is no longer present. The long-persistence luminescent material 18 may be doped with one or more ions, which may correspond to rare earth elements, for example, Eu2+, Tb3+, and/or Dy3. According to one non-limiting exemplary example, the luminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The luminescent structure 10, according to various examples, may be a translucent white color, and in some instances reflective, when unilluminated. Once the luminescent structure 10 receives the emitted light 24 of a particular wavelength, the luminescent structure 10 may emit any color light (e.g., blue or red) therefrom at any desired brightness. According to various examples, a blue emitting phosphorescent material may have the structure $Li_2ZnGeO_4$ and may be prepared by a high-temperature solid-state reaction method or through any other practicable method and/or process. The afterglow may last for a duration of 2-8 hours and may originate from the emitted light 24 and d-d transitions of Mn2+ ions.

According to an alternate non-limiting example, 100 parts of a commercial solvent-borne polyurethane, such as Mace resin 107-268, having 50% solids polyurethane in toluene/isopropanol, 125 parts of a blue-green long-persistence phosphor, such as Performance Indicator PI-BG20, and 12.5 parts of a dye solution containing 0.1% Lumogen Yellow F083 in dioxolane may be blended to yield a low rare earth mineral luminescent structure 10. It will be understood that the compositions provided herein are non-limiting examples. Thus, any phosphor known in the art may be utilized within the luminescent structure 10 without departing from the teachings provided herein. Moreover, it is contemplated that any long-persistence phosphor known in the art may also be utilized without departing from the teachings provided herein.

Referring to FIG. 2, a grille 28 of a vehicle 30 is generally supported on a front body structure 32 of the vehicle 30. The grille 28 is generally positioned proximately to a hood 34 and a bumper assembly 36. In some examples, the grille 28 includes a lighting assembly 38 extending in a vehicle side-to-side direction and between a pair of headlamps 40, 42. However, the lighting assembly 38 may be in any orientation without departing from the scope of the present disclosure. The grille 28 may further include vanes 44 that further impart a style to the grille 28. The grille 28 may be planar or arcuate to impart a linear or non-linear contour to the front body structure 32 of the vehicle 30. The grille 28 may also include indicia 46a-46d, or an emblem, affixed to the front of the grille 28. As will be described herein in greater detail, portions of the grille 28 may have a metallic appearance and may be capable of illuminating to provide functional lighting as well as impart a stylistic element to the vehicle 30. According to some examples, the grille 28 may illuminate to provide various notifications and messages to onlookers of the vehicle 30.

In some examples, the indicia 46a-46d may form a letter that is visible to vehicle onlookers. In other examples, the indicia 46a-46d may form a symbol, logo, or any other desired shape and may identify the manufacturer of the vehicle 30 or any other desired information. As will be described herein, the indicia 46a-46d may be configured to illuminate in one or more colors based on vehicle operation. In various instances, the indicia 46a-46d illuminate in a first color and transition to a second color based on the operation of one or more auxiliary turn indicators exemplarily shown as auxiliary turn indicators 48, 50.

The auxiliary turn indicators 48, 50 may be integrated with the grille 28 or elsewhere located on the vehicle 30. In some examples, the auxiliary turn indicators 48, 50 are concealed within the lighting assembly 38 such that they are not readily visible during periods of nonuse. When activated, light emitted from the auxiliary turn indicators 48, 50 is transmitted through an exterior portion 52 of the lighting assembly 38 and becomes visible to vehicle onlookers.

Referring to FIG. 3, the grille 28 may be configured as a multilayer component that may include a panel 54 that may be integrally formed and/or otherwise coupled with a substrate 56. The panel 54 may be coupled to the substrate 56 to define one or more cavities 58 therebetween. A circuit board 60 may be disposed, or sandwiched, between the panel 54 and the substrate 56 that may define a portion of the boundary of the one or more cavities 58. In some examples, one or more light sources 62 are disposed within each respective cavity 58, which may provide lighting and/or form the turn indicator 50. In various examples, control circuitry 64 and/or a sensor 66 may also be disposed within one or more of the cavities 58. The light sources 62, the control circuitry 64, and/or the sensor 66 are operably coupled with a controller 68 and a power source 70, which includes a conventional vehicle power source or an independent power source. In some instances, the panel 54 is sealingly coupled to the substrate 56 to at least partially protect any component (e.g., the light source 62, the circuit board 60, the control circuitry 64, the sensor 66, etc.) disposed therebetween. As used herein, "sealingly coupled" will be construed to mean any two components that are coupled to one another and contact (possibly directly to) one another.

In some examples, the circuit board 60 defines one or more openings 72 and the panel 54 may include one or more corresponding locators 74. During assembly, the locators 74 of the panel 54 are disposed within the openings 72 to position the two components in relation to one another. In some instances, the panel 54 is substantially disposed on a first side 76 of the circuit board 60 and the substrate 56 is molded to an opposing, second side 78 of the circuit board 60 and couples with the panel 54 and/or the circuit board 60 to protect the light sources 62, the control circuitry 64, and/or the sensor 66 from physical and chemical damage arising from environmental exposure.

The panel 54 may be formed from a polymeric material (including thermoplastic and thermosetting polymeric materials), an elastomeric material, a metallic material, combinations thereof, and/or any other material known in the art. The panel 54 may be transparent and/or translucent and have a decorative layer 80 disposed thereon. When the light sources 62 are activated, the panel 54 may emit light produced within the one or more cavities 58 through the panel 54. According to some examples, ultraviolet light-resistant materials and/or treatments may be employed in the panel 54 to enhance its resistance to ambient light-related degradation.

In a deactivated state, the decorative layer 80 is configured to control or modify an appearance of the grille 28. Once the light source 62 is activated, emitted light is transmitted through a portion of the panel 54 in a predefined manner to confer a desired appearance or message therefrom. Moreover, in some examples, the indicia 46a may be opaque regions that are disposed within the decorative layer 80, forwardly of the decorative layer 80, and/or rearward of the decorative layer 80.

In various examples, the decorative layer 80 may confer a plurality of various patterns, textures, colors, etc. to various portions of the panel 54. The decorative layer 80 can be disposed on an interior and/or an exterior surface of the panel 54 through any method known in the art, including, but not limited to, sputter deposition, vacuum deposition (vacuum evaporation coating), electroplating, and/or printing onto the panel 54. The decorative layer 80 may be chosen from a wide range of materials and/or colors, including, but not limited to, silver, chrome, copper, bronze, gold, or any other colored surface. Additionally, an imitator of any metallic material may also be utilized without departing from the teachings provided herein. In various examples, the decorative layer 80 may have a textured or grained surface. The grained surface may be produced on various portions of the panel 54 and may provide for the panel 54 to have a varied or common appearance with proximately disposed components of the vehicle 30.

According to various examples, any portion of the grille 28 may be formed through a multi-shot molding process. Due to fabrication and assembly steps being performed inside a mold, molded multi-material objects may allow a reduction in assembly operations and production cycle times. Furthermore, the product quality can be improved, and the possibility of manufacturing defects and total manufacturing costs can be reduced. In multi-material injection molding, multiple different materials are injected into a multi-stage mold. The sections of the mold that are not to be filled during a molding stage are temporarily blocked. After the first injected material sets, then one or more blocked portions of the mold are opened and the next material is injected. This process continues until the required multi-material part is created.

According to various examples, a multi-shot molding process is used to create the panel 54. Initially, a first transparent and/or translucent panel precursor material 102 (FIG. 4) is inserted into a mold to form a first portion 82 of the panel 54. The remaining portions 84 of the panel 54 may then be formed in a successive step by a second panel precursor material 102 that may be varied from the first. For example, the second panel precursor material 102 may have a colorant (e.g., amber) added thereto and/or be varied from the first panel precursor material 102. In some examples, the second portion 84 may be disposed proximate a light source 62 that forms the turn indictor.

Referring still to FIG. 3, when the light sources 62 are deactivated, the panel 54 may confer a desired appearance that is defined by the decorative layer 80 and/or a color of the panel precursor material 102 forming the panel 54 and the substrate 56. Moreover, the indicia 46a on the grille 28 may be substantially concealed when the light sources 62 are deactivated and/or not readily visible to an onlooker of the vehicle 30.

In some examples, the indicia 46a may not be readily visible when the light source 62 is in an unilluminated state and visible when the light source 62 is illuminated. In various instances, the luminescent structure 10 may form the indicia 46a that define one or messages, an emblem 46a-d, a logo, an artistic design (e.g., a cat's eye) or any other desired information that may be visible when the luminescent structure 10 is in a luminescent and/or non-luminescent state. In operation, the luminescent structure 10 receives the excitation light from the light source 62 and, in response, luminesces. According to various examples, the luminescent structure 10 discussed herein is substantially Lambertian; that is, the apparent brightness of the luminescent structure 10 is substantially constant regardless of an observer's angle of view. As described herein, the color of the converted light 26 (FIG. 1C) may be dependent on the particular luminescent materials 18 utilized in the luminescent structure 10. Additionally, a conversion capacity of the luminescent structure 10 may be dependent on a concentration of the luminescent material 18 utilized in the luminescent structure 10. By adjusting the range of intensities that may excite the luminescent structure 10, the concentration, types, and proportions of the luminescent materials 18 in the luminescent structure 10 discussed herein may be operable to generate a range of color hues of the excitation light 24 by blending a first wavelength with a second wavelength.

With further reference to FIG. 3, the control circuitry 64 includes LED drive circuitry for controlling activation and deactivation of the light sources 62 and/or circuitry for controlling the sensor 66. The circuit board 60 may be configured as a printed circuit board (PCB) that may be flexible or rigid. In some instances, the circuit board 60 may be substantially centrally disposed between the panel 54 and the substrate 56, which may reduce any bending of the circuit board 60. In some instances, the circuit board 60 may be formed from FR4 or any other practicable material. Moreover, in some examples, the circuit board 60 may be formed from a material having a high glass transition temperature Tg. As is known in the art, a material having a glass transition temperature (Tg) over 170° C. may be referred to as a high Tg material. In some instances, the circuit board 60 may have a Tg from about 170° C. to 350° C., from about 200° C. to 350° C., from about 225° C. to 350° C., from about 250° C. to 350° C., from about 275° C. to 350° C., or any and all values and ranges therebetween. In some examples, the light sources 62, the control circuitry 64, and/or the sensor 66 are disposed on a common, first side 76 of the circuit board 60. Accordingly, the substrate 56 may be molded to the opposite, second side 78 of the circuit board 60. In such instances, the circuit board 60 may have a high glass transition temperature Tg such that the circuit board 60 is not damaged during the molding of the substrate 56 to the second side 78 of the circuit board 60.

In some examples, conductive traces on the circuit board 60 may also be flexible such that the traces may extend or contract without breaking as the circuit board 60 is bent from a neutral position. The bending of the grille 28 may occur when the grille 28 is contacted by a person and/or an object. Additionally, bending of the grille 28 may occur due to temperature variations of the grille 28 in response to heat generated by the ambient environment in which the vehicle 30 is operated and/or heat generated by the vehicle 30. In some examples, the light sources 62, the control circuitry 64, and/or the sensor 66 are separated from the panel 54 by a predefined distance $d_1$. The predefined distance may be configured such that the panel 54 is spaced apart from the light sources 62, the control circuitry 64, and/or the sensor 66 when the panel 54 is coupled to the circuit board 60 and one or more of the panel 54, the substrate 56, and/or the circuit board 60 are flexed and/or bent from a neutral position. When the panel 54, the substrate 56, and/or the circuit board 60 are flexed and/or bent, the spaced-part relationship may protect the components of the grille 28.

The light sources 62 may include any form of light sources. For example, fluorescent lighting, light-emitting diodes (LEDs), organic LEDs (OLEDs), polymer LEDs (PLEDs), laser diodes, quantum dot LEDs (QD-LEDs), solid-state lighting, a hybrid of these or any other similar device, and/or any other form of lighting may be utilized within the lighting assembly 28. Further, various types of LEDs are suitable for use as the light sources 62 including, but not limited to, top-emitting LEDs, side-emitting LEDs, and others. Moreover, according to various examples, multicolored light sources 62, such as Red, Green, and Blue (RGB) LEDs that employ red, green, and blue LED packaging may be used to generate various desired colors of light outputs from a single light source 62, according to known light color mixing techniques. In operation, the controller 68 may selectively control the light sources 62 such that one, all, or a portion of the light sources 62 can be activated at any given time.

With further reference to FIG. 3, the sensor 66 may be encapsulated within one or more cavities 58 and may generate a detection field 86. The sensor 66 may be configured as proximity sensors, such as an ultrasonic sensor, a radar sensor, a LIDAR sensor, and/or any other type of sensor known in the art. The sensor 66 may be formed by printed conductive ink and/or by coupling preformed conductive circuitry to the panel 54 to encapsulate the sensor 66 between the panel 54 and the substrate 56.

In some examples, the sensor 66 may be formed with conductive ink or may alternatively be formed with flex circuitry. In some instances, the sensor 66 may be configured as an ink that is coated onto the panel 54, the substrate 56, and/or the circuit board 60 by conventional screen printing, flexographic printing, or gravure printing. In some examples, the ink is flexible and can be applied directly to or transferred onto the panel 54. The flexible, conductive ink may be moved as the panel 54 flexes and/or changes in size without breaking and while maintaining a stable set of electrical properties such as conductance over time and use. Additionally, the ink may be disposed in a flexible ink pattern and/or a stretchable insulator may be disposed over/surrounding the conductive ink. The stretchable, conductive ink may include a percentage of conductive material (e.g., around/approximately 20%, 25%, 30%, 35%, 40%, 45%, 50%, 55%, 60%, 65%, 70%), and a binder (e.g., acrylic binder that is formaldehyde-free), a thickener (e.g., polyurethane thickener) and a humectant and/or solvent (e.g., propylene glycol). The flexible ink may be configured to generally meet a minimum conductance as well as a minimum stretching property.

In general, the flexible ink may have a stretchability ranging from 5% to 200%, e.g., it may be stretched more than two times (200%) of its at-rest length without breaking. In some examples, the flexible ink can be stretched to more than three times (300%), more than four times (400%), or more than five times (500%) of its neutral, at rest length. The flexible ink is conductive and may have a low resistivity. Structurally, the flexible ink described herein may be made from a specified combination of an insulative adhesive and a conductive material. In general, a flexible ink may include a first (or base) layer of insulative and elastic adhesive and a layer of the conductive material, where the conductive material includes between about 40% and about 60% of conductive particles (e.g., carbon black, graphene, graphite, silver metal powder, copper metal powder, or iron metal powder, etc.).

Referring still to FIG. 3, the substrate 56 may also be formed from a polymeric material, an elastomeric material, a metallic material, combinations thereof, and/or any other material known in the art to form the substrate 56. The polymeric materials include thermoplastic and thermosetting polymeric materials, e.g., silicones, acrylics, and polycarbonates. In some examples, the substrate precursor material(s) 114 (FIG. 4) are selected to have a high flow rate and/or a low viscosity during a molding process, such as injection molding. In other examples, the substrate precursor material(s) 114 are selected with higher viscosity levels based on cost or other considerations when a less viscosity-dependent process is employed, such as insert molding. The substrate 56 can take on any of a variety of shapes, depending on the features of the panel 54 and other design considerations. For example, in some examples, one or more of the surfaces of the substrate 56 are planar (e.g., faceted), non-planar, curved or characterized by other shapes. As understood by those with ordinary skill in the field, the surfaces can be characterized with portions having planar features and portions having non-planar features.

In some examples, the substrate precursor material 114 may include a conductive polymer that may assist in grounding the light sources 62, the sensor 66, and/or the control circuitry 64 from electromagnetic interference. In some examples, the substrate 56 includes a carbon allotrope doped polymer. In some examples, the carbon allotrope doped polymer includes polyethylene terephthalate, nylons, polyacetals, polyacrylates, polycarbonates, polyethylene, low density polyethylene, high density polyethylene, polystyrene, polysulfone, polyvinylchloride, ultra-high molecular weight polyethylene, polytetrafluoroethylene, polyether ether ketone, combinations thereof, and/or any other polymer. In these and other examples, the carbon allotrope doped polymer may include graphite, graphene, carbon fibers, fullerenes, carbon nanotubes, single-walled carbon nanotubes, multi-walled carbon nanotubes, combinations thereof, and/or any other conductive material that may be added to the polymer material.

Referring still to FIG. 3, the light sources 62, while producing emitted light 24, also emit heat. As heat is emitted from the light sources 62, a heatsink 88 captures at least a portion of this heat. The captured heat is temporarily retained within elongated members 90 of the heatsink 88. The captured heat within the heatsink 88 migrates to areas that have a lower temperature than the heatsink 88. As such, the heatsink 88, after absorbing heat from the light sources 62, exchanges, or transfers heat to cooler regions in and around the grille 28.

In the various examples, the elongated members 90 of the heatsink 88 can extend generally perpendicular to a back portion 92 of the heatsink 88. The elongated members 90 can be linear or can include various angled and/or curved portions. It is contemplated that, in various instances, the elongated members 90 can extend in an angled configuration or a curved configuration, or both, relative to the back portion 92 of the heatsink 88. It is further contemplated that each elongated member 90 can have configurations that can include, but are not limited to, linear, curved, angled, and trapezoidal, among other configurations. Additionally, various cross members can be included that extend across the elongated members 90 to add structure to the elongated members 90 and also add surface area through which heat can be transferred from the grille 28. It is also contemplated that the elongated members 90 may not have a consistent length. Such configurations may include a triangular profile, a trapezoidal profile, a curved profile, an irregular profile, among other similarly shaped profiles. Various examples of the heatsink 88 may also include more than one row of elongated members 90, such as an inner layer and outer layer of elongated members 90.

Figure 4:
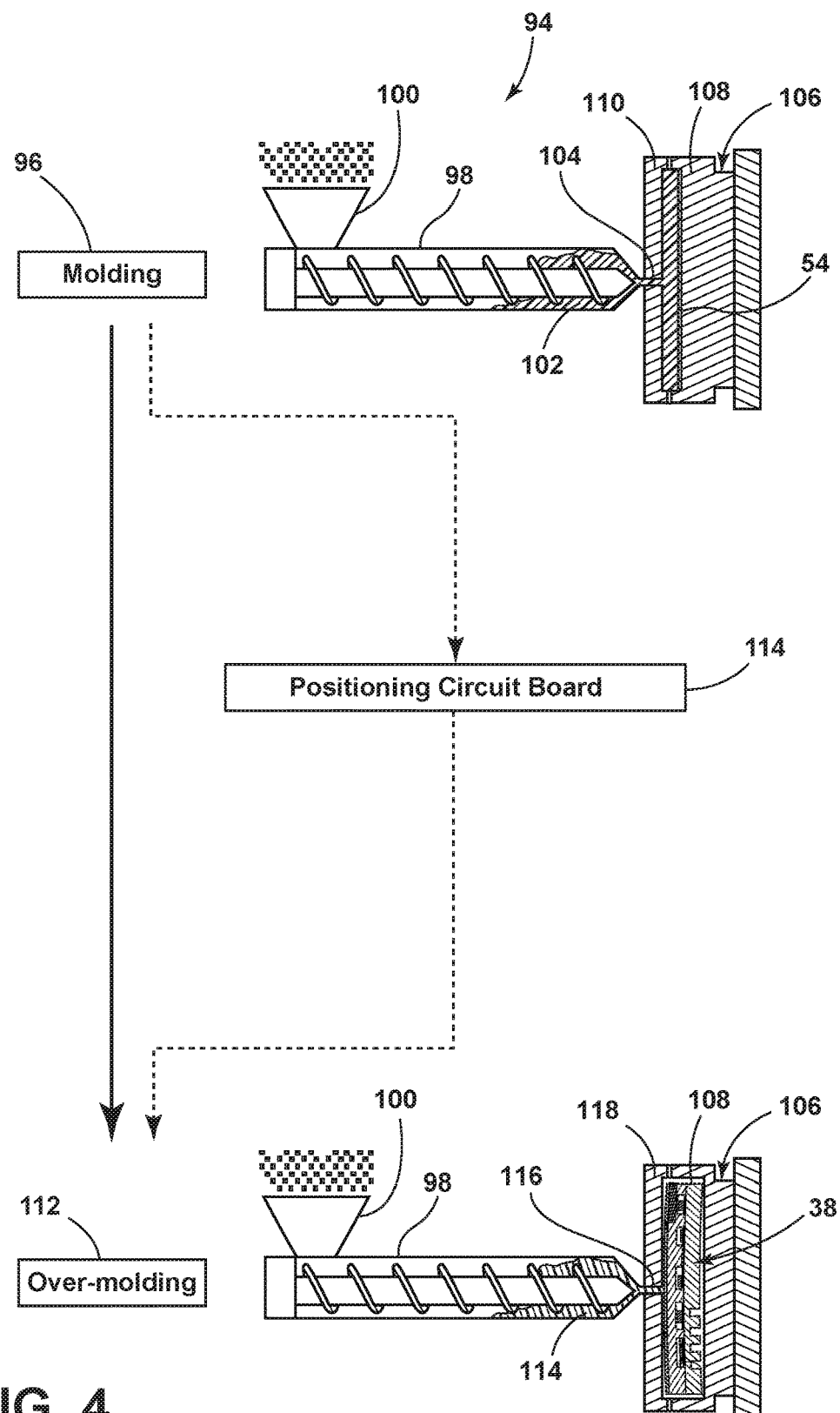
FIG. 4 is a flow chart schematic of a method of making the lighting assembly, according to some examples.

Referring to FIG. 4, a method 94 of making the lighting assembly 38 is depicted in a schematic flowchart, according to some examples. At step 96, the panel 54 is molded from one or more panel precursor materials 102. As shown in FIG. 4, an injection molding apparatus 98 with a hopper 100 for holding polymeric panel precursor material 102 can be employed to injection mold the panel 54. The injection molding apparatus 98 can be operated at a sufficient temperature to melt or otherwise promote flow of the panel precursor material 102 through an orifice 104 into a mold 106. The mold 106 includes two halves 108, 110. As the panel precursor material 102 is driven through the orifice 104 and into a cavity defined by the mold halves 108, 110, the mold 106 is cooled. Upon cooling in the cavity, the panel precursor material 102 is formed into the panel 54. At this point, the mold halves 108, 110 are separated and the panel 54 is removed. In some instances, the molding of the panel 54 may also include a multistep process in which a first panel precursor material 102 is injected into the mold prior to a second panel precursor material 102. The second panel precursor material 102 may have a colorant that is different from the first panel precursor material 102. The first and/or second panel precursor material 102 may form one or more cavities 58 and may define the one or more locators 74.

In some examples, the decorative layer 80 is configured as a film that is disposed within the mold prior to molding of the panel at step 96. The film may be preformed into a desired shape and positioned within the mold in a desired orientation. In some examples, the film may be thermoformed, vacuum formed, or otherwise molded prior to insertion into the mold. As provided herein, the film having the decorative layer 80 thereon may be disposed outwardly of the grille 28.

Referring again to FIG. 4, the method 94 of making the grille 28, or a portion thereof, also includes a step 112 of overmolding the substrate 56 over at least a portion of the panel 54 formed in step 96. As shown in FIG. 4, the injection molding apparatus 98 with a hopper 100 for holding the substrate precursor material 114 can be employed to injection mold the overmolded element, e.g., the substrate 56. In particular, the injection molding apparatus 98 can be operated at a sufficient temperature to melt or otherwise promote flow of the substrate precursor material 114 through an orifice 116 into the mold 106. The mold 106 includes two halves 108, 118. As the substrate precursor material 114 is driven through the orifice 116 and into a cavity defined by the mold halves 108, 118, the mold 106 is cooled. Upon cooling in the cavity, the substrate precursor material 114 is formed into the substrate 56 that is operably coupled with the panel 54. At this point in step 112, the mold halves 108, 118 are separated and the grille 28 containing the panel 54 and the substrate 56 are removed as a unitary component. Due to fabrication and assembly steps being performed inside a mold, molded multi-material objects may allow a reduction in assembly operations and production cycle times. Furthermore, the product quality can be improved, and the possibility of manufacturing defects and total manufacturing costs can be reduced. As discussed above, the substrate precursor material 114 may include a conductive filler therein and/or the substrate precursor material 114 may be otherwise thermally and/or electrically conductive.

According to some aspects, the method 94 for making the lighting assembly 38, as shown in FIG. 4, may further include one or more additional steps, such as positioning the circuit board 60 proximate the panel 54. As provided herein, the panel 54 may include one or more integrally formed locators 74. The one or more locators 74 may be disposed within openings 72 defined by the circuit board 60. Once the substrate 56 is molded along a second side 78 of the circuit board 60, the substrate 56 may be bonded to the panel 54 creating a sandwiched component with the circuit board 60, the light sources 62, the sensor 66, and/or the control circuitry 64 disposed therebetween.

Figure 5:
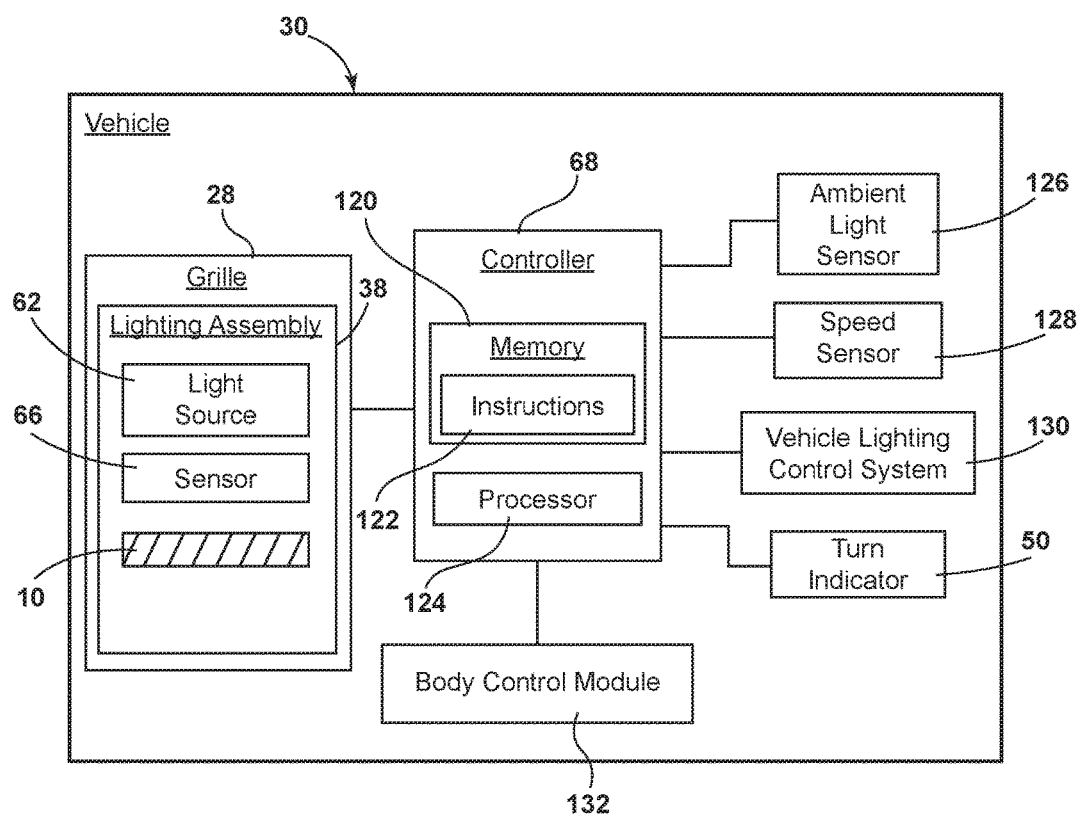
FIG. 5 is a block diagram of the illuminated grille, according to some examples.

Referring to FIG. 5, the light sources 62 of the grille 28 are operably connected to the controller 68 and may correspond to a standalone controller or are otherwise integrated with an existing vehicle system. The controller 68 includes a memory 120 having instructions 122 stored thereon that are executable by a processor 124. The instructions 122 may generally relate to ways in which to operate the light sources 62 to affect the manner in which the grille 28 illuminates or luminesces. The controller 68 may also communicate with other vehicle devices such as, but not limited to, an ambient light sensor 126, a speed sensor 128, a vehicle lighting control system 130, the turn indicator 50, as well as a body control module 132 of the vehicle 30. By leveraging these vehicle devices, the grille 28 may provide a variety of functional and/or aesthetic lighting. For example, the grille 28 may illuminate as a supplemental daytime running lamp, a hazard light, or a turn indicator 50. The grille 28 may also be illuminated during a welcome or departure event when a user unlocks or locks the vehicle 30. While a few specific examples have been provided herein, it will be apparent to those of ordinary skill in the art that the grille 28 may be illuminated to provide other types of lighting without departing from the scope of the present disclosure.

A variety of advantages may be derived from the use of the present disclosure. For example, use of the disclosed grille provides a unique aesthetic appearance to the vehicle. Moreover, the grille may provide lighting forwardly and/or outward of the vehicle. In some examples, the grille includes a circuit board that has components on one side thereof. The components may be disposed within one or more cavities. A thermally conductive polymer may form a substrate on an opposing side of the circuit board. The thermally conductive polymer may remove heat from the assembly and/or assist in grounding the light sources, the sensor, and/or the control circuitry from electromagnetic interference. Moreover, the circuit board may define one or more openings through which locators on the panel are inserted. An end portion of one or more of the locators may then be bonded with the substrate. The bonding of the panel to the substrate may seal the circuit board from environmental degradation. In addition, the panel, substrate, circuit board, and components disposed on the circuit board may be capable of flexing without reducing the lifespan of the lighting assembly. The grille may be manufactured at low costs when compared to standard vehicle lighting assemblies.

According to various examples, a vehicle lighting assembly is provided herein. The vehicle lighting assembly includes a panel defining an integrally formed cavity and a locator. A circuit board is disposed along the panel and defines an opening. The locator is disposed within the opening. A light source is coupled to the circuit board. The light source is disposed within the cavity. A substrate is disposed along an opposing side of the circuit board from the panel. Examples of the vehicle lighting assembly can include any one or a combination of the following features:

- a decorative layer disposed along an opposing surface of the panel from the circuit board;
- the decorative layer is formed as a thermoformed layer;
- the decorative layer defines indicia;
- the panel includes a first portion formed from a first material and a second portion formed from a second material, the second material having a varied colorant from the first material;
- a luminescent structure disposed within the decorative layer;
- a sensor operably coupled with the circuit board;
- the cavity is defined by one or more surfaces of the panel and a surface of the circuit board, the one or more surfaces separated from the light source;
- the substrate is bonded to an end portion of the locator;
- the substrate is formed from a thermally conductive polymer;
- the substrate defines one or more fins, the fins configured to remove heat from the substrate; and/or
- the lighting assembly is disposed within a vehicle grille.

Moreover, a method of manufacturing a vehicle lighting assembly is provided herein. The method includes forming a panel defining an integrally formed cavity and a locator. The method also includes coupling a light source coupled to a circuit board. The method further includes aligning a circuit board along the panel that defines an opening. Further, the method includes positioning the locator within the opening and the light source within the cavity. Lastly, the method includes forming a substrate along an opposing side of the circuit board from the panel.

According to some examples, a vehicle lighting assembly is provided herein. The vehicle lighting assembly includes a panel defining an integrally formed cavity. A circuit board is disposed along the panel. A light source is coupled to the circuit board. The light source is disposed within the cavity. A substrate is disposed along an opposing side of the circuit board from the panel. The substrate is formed from a thermally conductive polymer. Examples of the vehicle lighting assembly can include any one or a combination of the following features:

- the substrate defines one or more fins, the fins configured to remove heat from the substrate;
- the substrate is bonded to an end portion of the panel; and/or
- the panel includes a first portion formed from a first material and a second portion formed from a second material, the second material having a varied colorant from the first material.

According to other examples, a vehicle lighting assembly is provided herein. The vehicle lighting assembly includes a circuit board disposed along a panel. A light source is coupled to the circuit board. A substrate is disposed along an opposing side of the circuit board from the panel. The light source is encapsulated between the panel and the substrate. Examples of the vehicle lighting assembly can include any one or a combination of the following features:

- a switch assembly disposed on the circuit board and configured to selectively activate the light source;
- the substrate is formed from a thermally conductive polymer; and/or
- a decorative layer disposed along an opposing surface of the panel from the circuit board.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor examples discussed above might include computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration, and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A vehicle lighting assembly comprising:
   a panel defining an integrally formed cavity and a locator;
   a circuit board disposed along the panel and defining an opening, the locator disposed within the opening;
   a light source coupled to the circuit board, the light source disposed within the cavity; and
   a substrate disposed along an opposing side of the circuit board from the panel.

2. The vehicle lighting assembly of claim 1, further comprising:
   a decorative layer disposed along an opposing surface of the panel from the circuit board.

3. The vehicle lighting assembly of claim 2, wherein the decorative layer is formed as a thermoformed layer.

4. The vehicle lighting assembly of claim 3, wherein the decorative layer defines indicia.

5. The vehicle lighting assembly of claim 1, wherein the panel includes a first portion formed from a first material and a second portion formed from a second material, the second material having a varied colorant from the first material.

6. The vehicle lighting assembly of claim 2, further comprising:
   a luminescent structure disposed within the decorative layer.

7. The vehicle lighting assembly of claim 1, further comprising:
   a sensor operably coupled with the circuit board.

8. The vehicle lighting assembly of claim 1, wherein the cavity is defined by one or more surfaces of the panel and a surface of the circuit board, the one or more surfaces separated from the light source.

9. The vehicle lighting assembly of claim 1, wherein the substrate is bonded to an end portion of the locator.

10. The vehicle lighting assembly of claim 1, wherein the substrate is formed from a thermally conductive polymer.

11. The vehicle lighting assembly of claim 1, wherein the substrate defines one or more fins, the fins configured to remove heat from the substrate.

12. The vehicle lighting assembly of claim 1, wherein the lighting assembly is disposed within a vehicle grille.

13. A vehicle lighting assembly comprising:
    a panel defining an integrally formed cavity;
    a circuit board disposed along the panel;
    a light source coupled to the circuit board, the light source disposed within the cavity; and
    a substrate disposed along an opposing side of the circuit board from the panel, wherein the substrate is formed from a thermally conductive polymer.

14. The vehicle lighting assembly of claim 13, wherein the substrate defines one or more fins, the fins configured to remove heat from the substrate.

15. The vehicle lighting assembly of claim 13, wherein the substrate is bonded to an end portion of the panel.

16. The vehicle lighting assembly of claim 13, wherein the panel includes a first portion formed from a first material and a second portion formed from a second material, the second material having a varied colorant from the first material.

17. A vehicle lighting assembly comprising:
    a circuit board disposed along a panel;
    a light source coupled to the circuit board; and
    a substrate disposed along an opposing side of the circuit board from the panel, wherein the light source is encapsulated between the panel and the substrate.

18. The vehicle lighting assembly of claim 17, wherein the substrate defines one or more fins, the fins configured to remove heat from the substrate.

19. The vehicle lighting assembly of claim 17, wherein the substrate is formed from a thermally conductive polymer.

20. The vehicle lighting assembly of claim 17, further comprising:
    a decorative layer disposed along an opposing surface of the panel from the circuit board.

* * * * *